(12) United States Patent
Bliton et al.

(10) Patent No.: US 7,998,564 B2
(45) Date of Patent: Aug. 16, 2011

(54) CONCRETE CURING BLANKETS THAT PROMOTE EVEN CONCRETE CURING

(75) Inventors: Richard James Bliton, Greensboro, NC (US); Phil Harris, High Point, NC (US)

(73) Assignee: Precision Fabrics Group, Inc., Greensboro, NC (US)

( * ) Notice: Subject to any disclaimer, the term of this patent is extended or adjusted under 35 U.S.C. 154(b) by 26 days.

(21) Appl. No.: 12/346,188

(22) Filed: Dec. 30, 2008

(65) Prior Publication Data

US 2009/0169849 A1    Jul. 2, 2009

Related U.S. Application Data

(60) Provisional application No. 61/018,555, filed on Jan. 2, 2008.

(51) Int. Cl.
  *B32B 27/32* (2006.01)
  *B29C 35/02* (2006.01)

(52) U.S. Cl. ........ 428/219; 428/198; 428/220; 428/500; 264/31; 442/85

(58) Field of Classification Search .................. 428/219, 428/500, 220, 198; 442/85; 264/31
See application file for complete search history.

(56) References Cited

U.S. PATENT DOCUMENTS

| | | | | |
|---|---|---|---|---|
| 4,485,137 A | * | 11/1984 | White | 428/57 |
| 5,882,769 A | * | 3/1999 | McCormack et al. | 428/152 |
| 5,986,166 A | * | 11/1999 | Mukaida et al. | 604/368 |
| 6,713,411 B2 | * | 3/2004 | Cox et al. | 442/136 |
| 2006/0099338 A1 | * | 5/2006 | Boelz et al. | 427/207.1 |

* cited by examiner

*Primary Examiner* — David Sample
*Assistant Examiner* — Tahseen N Khan
(74) *Attorney, Agent, or Firm* — Myers Bigel Sibley & Sajovec, P.A.

(57) ABSTRACT

A concrete curing blanket includes a layer of absorbent material and a layer of impervious material bonded to the absorbent material layer in face-to-face relationship at intermittent locations such that the impervious material layer between the intermittent locations can lift away from the layer of absorbent material in response to air bubbles rising through the layer of absorbent material. The intermittent bonding locations may take the form of a pattern or may have a random occurrence. The absorbent layer of material is a hydrophilic nonwoven fabric and the impervious material layer is a film.

22 Claims, 3 Drawing Sheets

CONCRETE CURING BLANKETS THAT PROMOTE EVEN CONCRETE CURING

RELATED APPLICATION

This application claims the benefit of and priority to U.S. Provisional Patent Application No. 61/018,555, filed Jan. 2, 2008, the disclosure of which is incorporated herein by reference as if set forth in its entirety.

FIELD OF THE INVENTION

The present invention relates generally to concrete and, more particularly, to concrete curing.

BACKGROUND

Concrete is a widely used construction material. In general, concrete comprises cement, coarse and fine aggregates, and chemical additives. Concrete is conventionally cured in the presence of water to optimize cement hydration. The water reacts with the cement, bonding the components together and forming a solid article of manufacture. Concrete strength and water-resistance improves when cement is thoroughly hydrated during curing. Proper curing slows the loss of moisture from concrete and reduces early carbonation of the surface. Excessive evaporation and drying of concrete inhibits hydration. If drying is excessive, light traffic on a concrete surface may result in dusting. Moreover, craze cracking often may be attributed to inadequate curing.

A concrete surface is conventionally kept wet during curing by applying water frequently thereto and then covering the surface with a moisture retaining material. Material, such as burlap, conventionally is placed on a newly poured concrete surface as soon as possible without marking the concrete surface. The material is kept continuously wet and in place as long as possible. To ensure continuity of moist curing under the material, and without intermittent drying, a plastic (e.g., polyethylene) sheet is conventionally laid on top of the material to serve as a moisture barrier.

Conventional covering materials, however, can cause non-uniform coloration ("blotchiness") in cured concrete. Surface blotchiness may be accentuated by plastic barrier materials that are exposed to sunlight during curing. Furthermore, incomplete contact between the moisture retaining material and concrete surface as a result of trapped air pockets may lead to concrete discoloration.

A conventional concrete curing blanket 10 is illustrated in FIGS. 1A and 1B. The illustrated concrete curing blanket 10 includes a layer of absorbent material 12 and a layer of impervious material 14 laminated to the absorbent material layer 12 in face-to-face contact with each other, for example via an adhesive layer 17, to form a composite article. In use, the concrete curing blanket 10 is placed on a surface 16a of a poured concrete slab 16 such that the absorbent material layer 12 is in contact with the surface 16a, as illustrated in FIG. 1A. Air trapped beneath the concrete curing blanket 10 may create air bubbles 20 that cause the concrete curing blanket 10 to lift away from the concrete surface 16, as illustrated in FIG. 1B, thereby causing surface blotchiness.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

In view of the above discussion, concrete curing blankets that promote even curing and that can substantially reduce or prevent concrete discoloration due to trapped air pockets, and methods of using same, are provided. According to some embodiments of the present invention, a concrete curing blanket includes a layer of absorbent material and a layer of impervious material bonded to the absorbent material layer in face-to-face relationship at intermittent locations such that the impervious material layer between the intermittent locations can lift away from the layer of absorbent material in response to air bubbles rising through the layer of absorbent material. The intermittent bonding locations may take the form of a pattern (e.g., adjacent, spaced-apart strips, etc.) or may be random. In some embodiments, the absorbent layer of material is a hydrophilic nonwoven fabric (e.g., a spunlaced blend of one or more of the following materials: polyester, polyethylene, cellulosic materials, etc.) and the impervious material layer is a film (e.g., polyethylene film).

According to some embodiments of the present invention, a method of curing concrete includes pouring a slab of concrete, wherein the concrete slab has an exposed surface, flooding the concrete surface with water, covering the concrete surface and water on the surface with a concrete curing blanket, and then allowing the concrete to cure for a predetermined period of time. The concrete curing blanket includes a layer of absorbent material and a layer of impervious material bonded to the absorbent material layer in face-to-face relationship at intermittent locations. As such, the impervious material layer between the intermittent locations can lift away from the layer of absorbent material in response to air bubbles rising through the layer of absorbent material.

Other concrete curing blankets and methods, according to exemplary embodiments of the present invention, will be or become apparent to one with skill in the art upon review of the following drawings and detailed description. It is intended that all such additional concrete curing blankets and methods be included within this description, be within the scope of the present invention, and be protected by the accompanying claims.

DETAILED DESCRIPTION

The present invention now is described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items and may be abbreviated as "/". As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries and this specification, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Figure 1A:
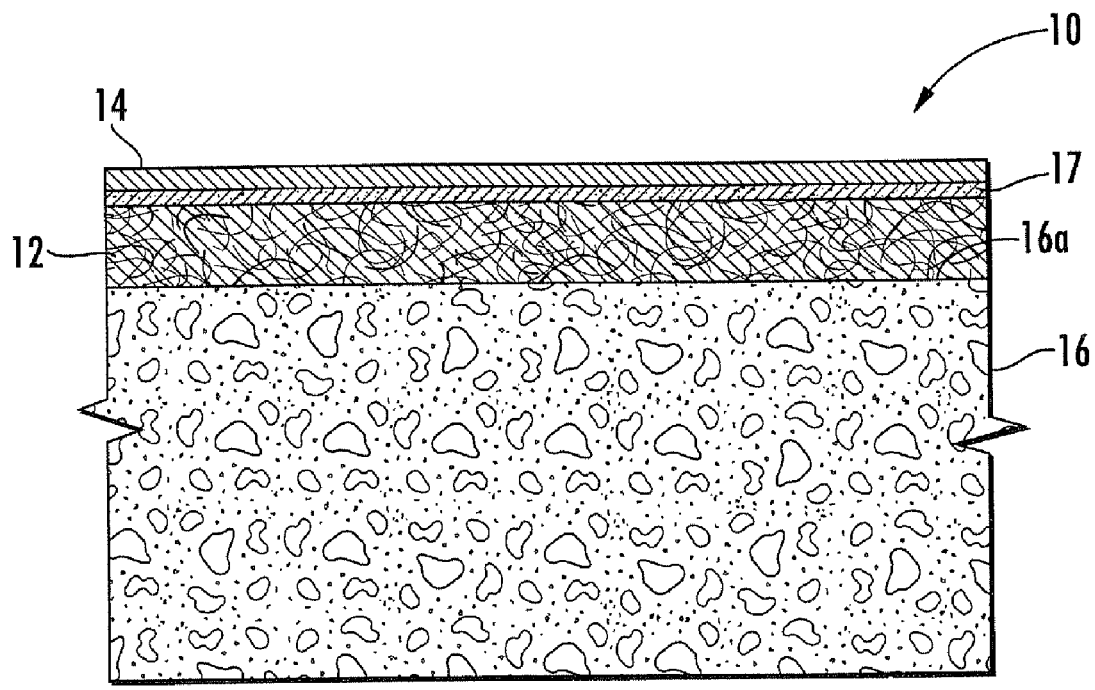
FIGS. 1A and 1B are cross-sectional views of a conventional concrete curing blanket on a concrete slab.
Figure 1B:
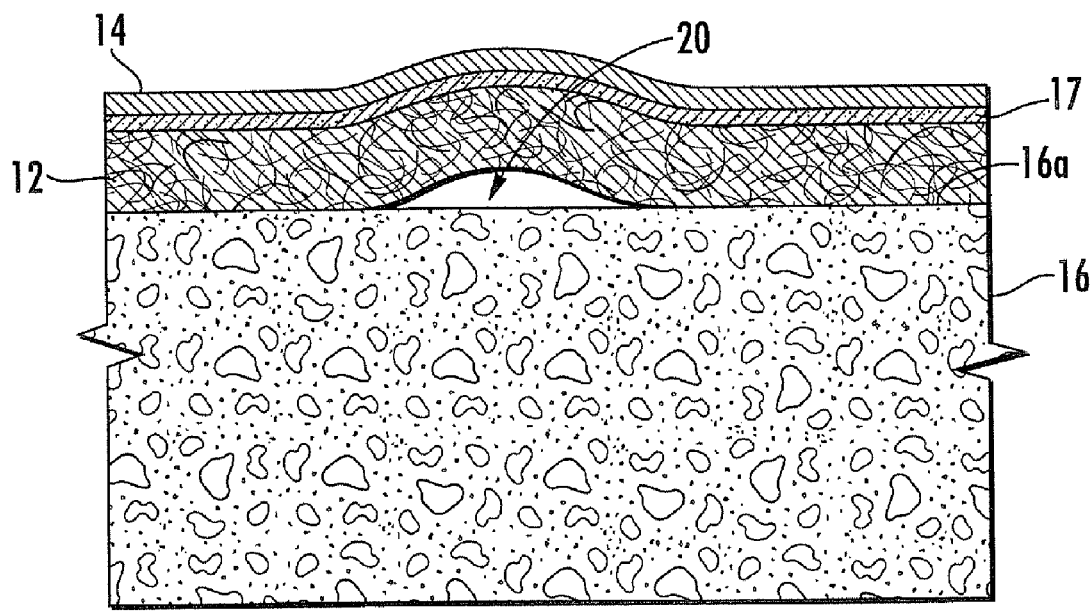
Figure 2A:
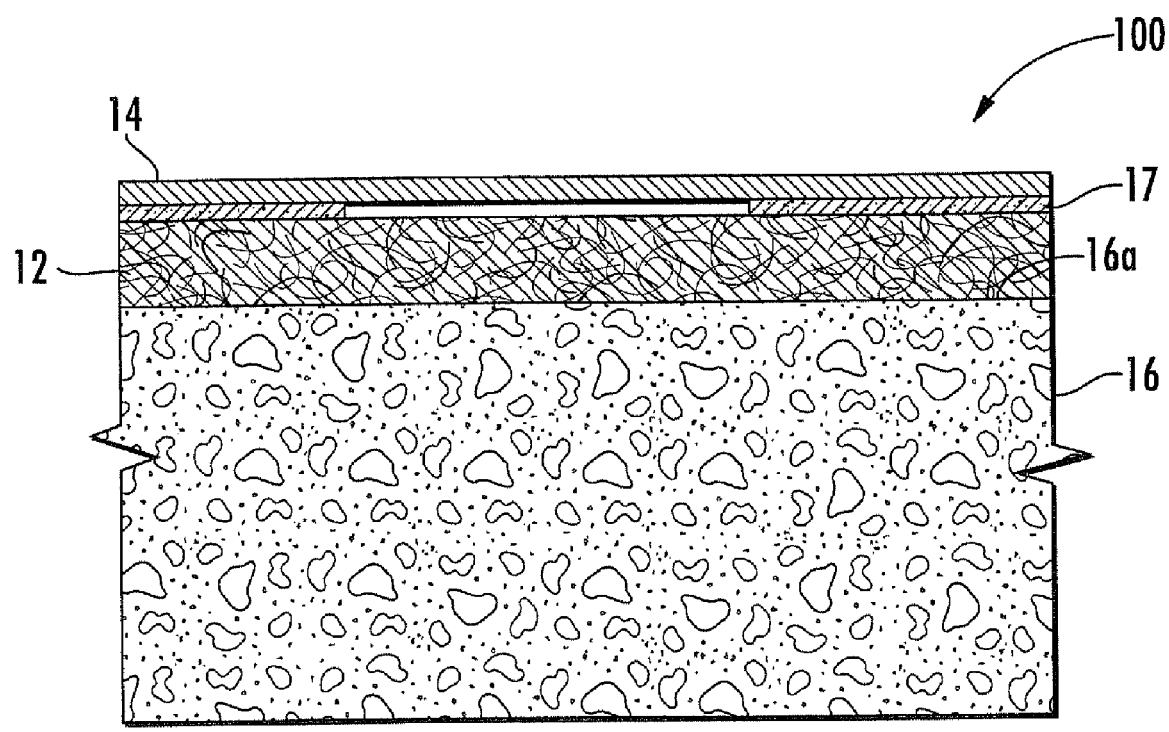
FIGS. 2A and 2B are cross-sectional views of a concrete curing blanket, according to some embodiments of the present invention.
Figure 2B:
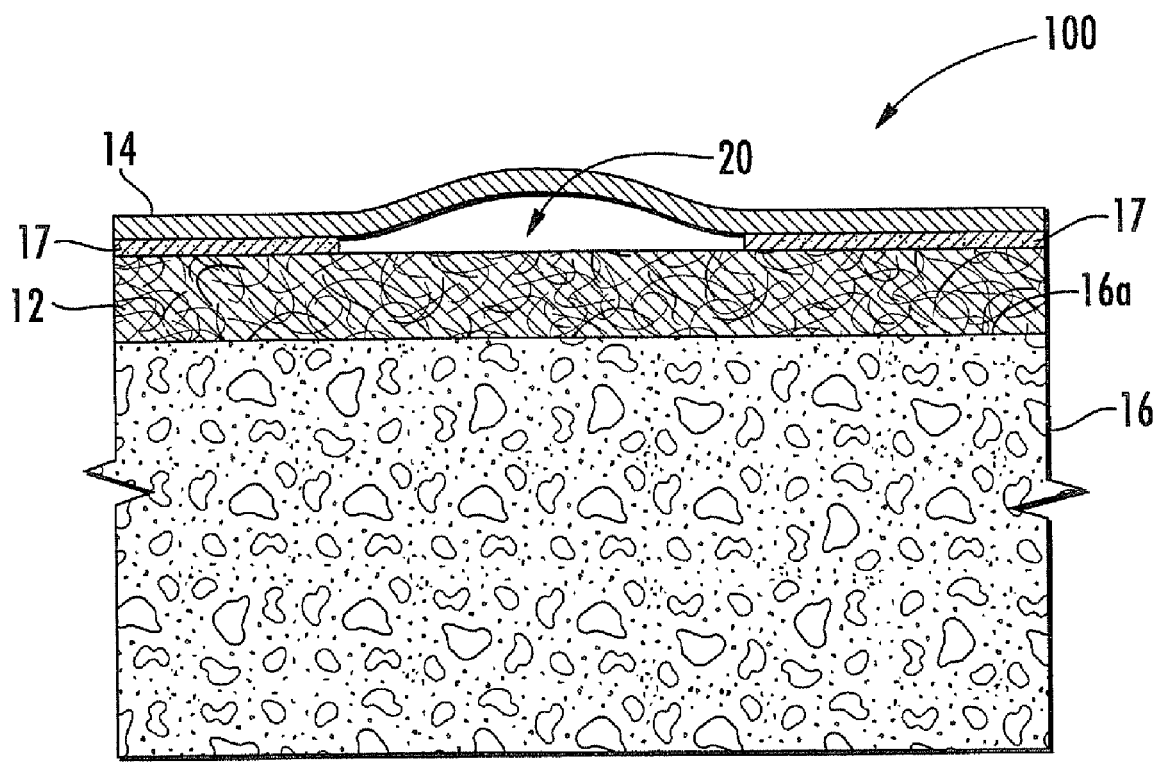
Figure 3:
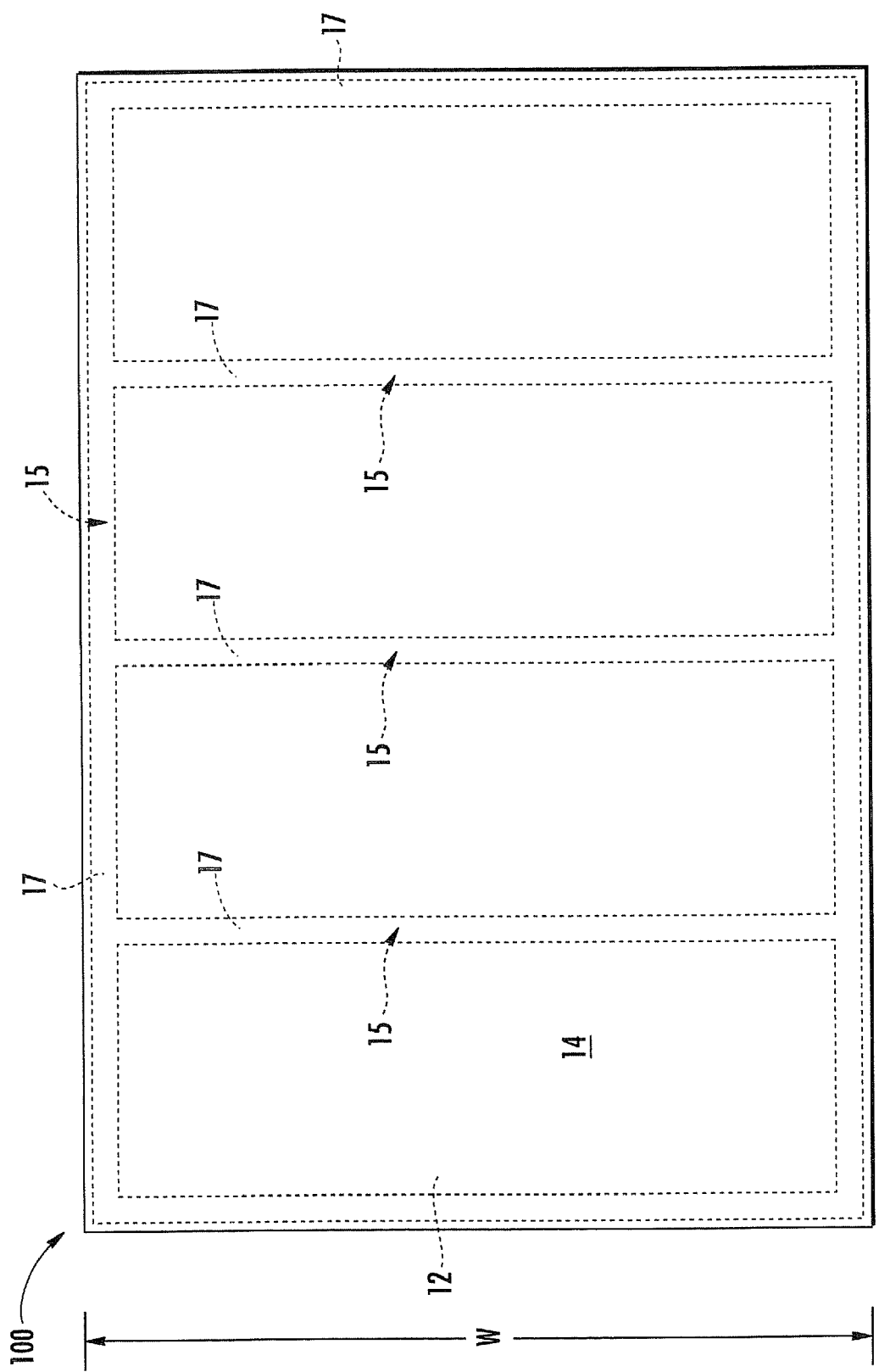
FIG. 3 is a plan view of a concrete curing blanket in accordance with some embodiments of the present invention.

Embodiments of the present invention provide concrete curing blankets that promote even concrete curing and that help prevent concrete discoloration due to trapped air pockets. As illustrated in FIGS. 2A-2B and FIG. 3 a concrete curing blanket 100, according to some embodiments of the present invention, includes a layer of absorbent material 12 and a layer of impervious material 14 bonded to the absorbent material layer 12 at intermittent locations 15 such that the absorbent material layer 12 maintains continuous face-to-face contact with the surface 16a of a poured concrete slab 16 or other concrete article of manufacture when air bubbles 20 cause the impervious material layer 14 to lift away from the concrete surface 16a. The two layers 12, 14 are bonded together (e.g., adhesively bonded, thermally bonded, ultrasonically bonded, etc.) such that there are substantial areas where the absorbent material and the impervious material are unbonded, but such that there are sufficient areas that the absorbent material and the impervious material are bonded to allow the concrete curing blanket 100 to be transported as a single material.

The unbonded areas prevent the formation of air bubbles 20 adjacent to the concrete surface 16a by allowing trapped air to permeate through the absorbent material layer 12 and reach equilibrium between the absorbent material layer 12 and the impervious material layer 14. This effectively moves trapped air away from the surface 16a of the concrete 16 and traps it between the absorbent material layer 12 and the impervious material layer 14, as illustrated in FIG. 2B. As a result, the face-to-face contact between the absorbent material layer 12 and the green concrete surface 16a will be maintained and will be substantially uniform throughout. This uniform contact during curing facilitates even cosmetic appearance and substantially reduces or eliminates areas of discoloration caused by air pockets between the concrete 16 and the absorbent material layer 12.

The impervious material layer 14 and absorbent material layer 12 are adhesively bonded together at intermittent locations 15, for example, as illustrated in FIG. 3. The adhesive material 17 may be applied to either the absorbent material layer 12 or the impervious material layer (or to both) at intermittent locations 15 and then the impervious material layer 14 and absorbent material layer 12 are bonded together in face-to-face relationship. In the illustrated embodiment, the intermittent locations 15 of adhesive 17 include narrow strips in adjacent, spaced-apart relationship that extend across the width W of the concrete curing blanket 100, and a narrow strip that extends around the periphery of the concrete curing blanket 100. It is understood, however, that FIG. 3 is for illustrative purposes only. The adhesive 17 can be applied in various intermittent locations and/or in any pattern without limitation. Moreover, the adhesive 17 can be applied in random intermittent locations.

Various adhesives may be utilized without limitation. For example, an exemplary adhesive may be a polyolefin hot melt adhesive. In some embodiments of the present invention, an adhesive may be an ultraviolet-durable adhesive. In other embodiments, pressure-sensitive adhesives may be utilized. However, embodiments of the present invention are not limited to adhesive bonding or to any type of adhesive. Various types of bonding (e.g., thermal bonding, ultrasonic bonding, etc.) may be utilized, without limitation.

The absorbent material layer 12 is hydrophilic and provides a wicking effect which draws the concrete curing blanket 100 down to the concrete surface 16a. An exemplary absorbent material for use as the absorbent material layer 12 is a nonwoven fabric; however, other types of material may be utilized. In addition to being highly wickable and absorbent, the absorbent material layer 12 may be thin, compared with conventional wicking layers, which helps keep moisture as close to the concrete surface as possible. Applicants have found that a thin absorbent material layer 12 as described herein can maintain an even moisture level better than a layer of material three to four times in thickness. Moreover, the absorbent material layer 12 is capable of wicking moisture from low areas of a concrete surface to higher areas, thereby keeping the moisture content of the absorbent material layer 12 substantially uniform.

According to some embodiments of the present invention, the absorbent material layer 12 may have a thickness of less than about 0.02 inches, which is substantially less than conventional wicking layers that typically have thicknesses of 0.080 inches and higher. In addition, the absorbent material layer 12 may be lightweight compared with conventional wicking layers. According to some embodiments of the present invention, the absorbent material layer 12 may have a weight of less than about 55 grams per square meter (gm/m$^2$). According to some embodiments of the present invention, the absorbent material layer 12 may have a weight of less than about 70 gm/m$^2$. Both embodiments are substantially less than conventional wicking layers that have a weight of approximately 150 gm/m$^2$ and higher. However, embodiments of the present invention are not limited to an absorbent material layer 12 having any particular weight or thickness.

Exemplary nonwoven materials that may be utilized as the absorbent material layer 12 include, but are not limited to, spunlaced fabrics, resin bonded fabrics, thermal bonded fabrics, air laid pulp fabrics, and stitchbonded fabrics. In some embodiments, the nonwoven material is a spunlaced fabric made from a combination of cellulosic and synthetic fibers. Cellulosic fibers that may be used to form the spunlaced fabric include, but are not limited to, woodpulp fibers, cotton fibers, regenerated cellulose fibers such as rayon or lyocell (e.g., Tencel® brand lyocell, from Courtaulds Fibres (Holdings) Limited, United Kingdom), cellulose acetate fibers, cellulose triacetate fibers, jute, hemp and any bast, leaf or stem fibers. Synthetic fibers that may be used to form the spunlaced fabric include, but are not limited to, polyester, nylon, and acrylic fibers.

In some embodiments, the relative proportions of polyester and cellulosic fibers, for example, may be about 50% polyester and 25% cellulosic fibers (e.g., rayon, lyocell, etc.). However, these proportions may be somewhat lower or substantially higher, without limitation. Generally, the polyester component provides strength and the cellulosic fiber component provides absorbency. Other components/fibers may be added to increase strength, and/or resist tearing, and/or absorbency.

According to other embodiments of the present invention, the absorbent material layer 12 may be a spunlaced blend of polyethylene and rayon. The relative proportions of the polyethylene and rayon may be about 30% polyethylene and about 30% rayon. However, these proportions may be somewhat lower or substantially higher, without limitation.

The impervious material layer 14 serves as a moisture barrier that substantially prevents evaporation of moisture from a concrete surface 16a. In some embodiments of the present invention, the impervious material layer 14 may have a thickness less than or equal to about 1 mil (0.001 inch), and may have a moisture vapor transport rate of less than about 0.0016 grams per square foot per twenty-four hours ($gm/ft^2$/ 24 hours). However, an impervious material layer 14 incorporated into a concrete curing blanket according to embodiments of the present invention may have other thicknesses and other moisture vapor transport rates (MVTR), and is not limited to any particular thickness or MVTR. For example, thicker layers may be used to increase handling ability and other characteristics.

In some embodiments, the impervious material layer 14 is a layer of film. Exemplary types of film comprise polyolefins and may include, but are not limited to, polyethylene, including linear low-density polyethylene (LLDPE), low density polyethylene (LDPE), ultra low density polyethylene (ULDPE), high density polyethylene (HDPE), or polypropylene and blends thereof with the above and/or other materials.

In some embodiments, the impervious material layer 14 may have an outer surface with a light reflective color selected to reflect sunlight. In other embodiments, the impervious material layer 14 may have an outer surface with a light absorptive color selected to absorb sunlight and retain heat therefrom. In yet further embodiments, the impervious material layer 14 may include one or more portions with a light reflective color that reflects sunlight and one or more portions with a light absorptive color that absorbs sunlight and retains heat therefrom. Color may be changed, for example, from white to darker colors according to environmental conditions. For example, areas of a concrete slab receiving greater heat and sunshine may require a reflective film (e.g., a film with a light color, such as white, silver, etc.), while colder areas of a concrete slab (e.g., areas in shade) may need a darker film to absorb and retain heat. In some embodiments, materials of different colors may be applied to the outer surface 14a of the impervious material layer 14 to facilitate sunlight reflections and/or absorption, and may be applied in the field.

According to some embodiments, the impervious material layer 14 may have a weight of about 24 $gm/m^2$. Thus, when combined with the absorbent material layer 12, concrete curing blankets according to some embodiments of the present invention may be lightweight and easy to handle compared with conventional curing blankets which may be heavy and difficult to handle. For example, a combined weight of the impervious material layer 14 and absorbent material layer 12 may be less than about 100 $gm/m^2$.

Use of a concrete curing blanket according to some embodiments of the present invention is now described. After concrete has been poured, it is finished and allowed to partially dry. At this point (e.g., after approximately one day) the concrete is hard to touch and can be walked on. The concrete surface 16a is then flooded with water and a concrete curing blanket 100, according to an embodiment of the present invention, is applied on top of the water layer with the absorbent material layer 12 in face-to-face contact with the concrete surface and water. The concrete is then left for a period of time (e.g., in some embodiments, approximately seven days) to final cure. Upon removal of the curing blanket, the cured concrete has the correct moisture content and the surface is uniformly colored.

EXAMPLE

A Spuntec 1.475 ounce/$yd^2$, 60% rayon: 40% polyester blend, spunlaced nonwoven fabric (Gizeh Spuntec Vliesstoffwerk GmbH, Germany) was laminated to a Pliant 0.001 inch thick polyethylene film (Pliant Corporation, Danville, Ky.) using Huntsman Rextac™ 2730 amorphous poly alpha olefin hot melt adhesive (Huntsman Corporation, Houston, Tex.), such that the finished laminate was 126 inches wide and the adhesive was applied only to the outer 6 inches of the laminate width and in 5 inch strips on either side of an unlaminated middle zone 50 inches wide. The adhesive laminated zones on each edge and on either side of the unlaminated middle 50 inch zone join the two substrates so that they can be handled as one layer. The unlaminated zones between the strips of adhesive allow the material to behave like two separate layers so that the fabric layer can maintain contact with a concrete slab and any air pockets can pass through the fabric layer to reside between the fabric layer and the film layer.

The foregoing is illustrative of the present invention and is not to be construed as limiting thereof. Although a few exemplary embodiments of this invention have been described and several examples provided, those skilled in the art will readily appreciate that many modifications are possible in the exemplary embodiments without materially departing from the novel teachings and advantages of this invention.

That which is claimed is:

1. A concrete curing blanket, comprising:
a layer of absorbent material; and
a layer of impervious material bonded to the absorbent material layer in face-to-face relationship at intermittent locations, wherein the concrete curing blanket is configured to be placed on a concrete surface such that the layer of absorbent material is in face-to-face contact with the surface, wherein the impervious material layer between the intermittent locations lifts away from the layer of absorbent material in response to air rising through the layer of absorbent material and traps the air between the layer of absorbent material and the impervious material layer such that the layer of absorbent material maintains continuous face-to-face contact with the surface.

2. The concrete curing blanket of claim 1, wherein the impervious material layer is bonded to the absorbent material layer at adjacent spaced-apart locations.

3. The concrete curing blanket of claim 1, wherein the absorbent material layer and impervious material layer are adhesively bonded at the intermittent locations.

4. The concrete curing blanket of claim 1, wherein the absorbent material layer comprises hydrophilic nonwoven fabric.

5. The concrete curing blanket of claim 1, wherein the impervious material layer has a thickness less than or equal to about 0.001 inch.

6. The concrete curing blanket of claim 1, wherein the impervious material layer has a moisture vapor transport rate of less than about 0.0016 grams per square foot per twenty-four hours ($gm/ft^2/24$ hours).

7. The concrete curing blanket of claim 1, wherein the impervious material layer is a film layer.

8. The concrete curing blanket of claim 1, wherein the impervious material layer comprises one or more portions with a light reflective color that reflects sunlight.

9. The concrete curing blanket of claim 1, wherein the impervious material layer comprises one or more portions with a light absorptive color that absorbs sunlight and retains heat therefrom.

10. The concrete curing blanket of claim 1, wherein the impervious material layer comprises one or more portions with a light reflective color that reflects sunlight and one or more portions with a light absorptive color that absorbs sunlight and retains heat therefrom.

11. The concrete curing blanket of claim 1, wherein a combined weight of the absorbent material layer and the impervious material layer is less than about 100 grams per square meter ($gm/m^2$).

12. The concrete curing blanket of claim 1, wherein the absorbent material layer has a thickness of less than about 0.020 inches.

13. The concrete curing blanket of claim 1, wherein the absorbent material layer has a weight of less than or equal to about 70 grams per square meter.

14. The concrete curing blanket of claim 3, wherein the impervious material layer is adhesively bonded to the absorbent material layer with an ultraviolet-durable adhesive.

15. The concrete curing blanket of claim 3, wherein the impervious material layer is adhesively bonded to the absorbent material layer with a polyolefin hot melt adhesive.

16. The concrete curing blanket of claim 4, wherein the nonwoven fabric comprises a spunlaced blend of polyester and rayon.

17. The concrete curing blanket of claim 7, wherein the film layer comprises polyethylene film.

18. A method of curing concrete, comprising:
pouring a slab of concrete, wherein the concrete slab has an exposed surface;
flooding the concrete surface with water;
covering the concrete surface and water on the surface with a concrete curing blanket, wherein the concrete curing blanket comprises:
a layer of absorbent material; and
a layer of impervious material bonded to the absorbent material layer in face-to-face relationship at intermittent locations such that the impervious material layer between the intermittent locations can lift away from the layer of absorbent material in response to air bubbles rising through the layer of absorbent material; and
allowing the concrete to cure for a predetermined period of time.

19. The method of claim 18, wherein the impervious material layer is bonded to the absorbent material layer at adjacent spaced-apart locations.

20. The method of claim 18, wherein the absorbent material layer and impervious material layer are adhesively bonded at intermittent locations.

21. The method of claim 18, wherein the absorbent material layer comprises hydrophilic nonwoven fabric.

22. The method of claim 18, wherein the impervious material layer is a film layer.

* * * * *